Aug. 11, 1936.  E. A. BAUMBACH  2,050,413

COMBINED DRILL AND BORING TOOL

Filed April 27, 1935

Inventor:
Emil A. Baumbach
By Jones, Addington, Ames & Seibold
Attys.

Patented Aug. 11, 1936

2,050,413

UNITED STATES PATENT OFFICE 2,050,413

COMBINED DRILL AND BORING TOOL

Emil A. Baumbach, Chicago, Ill.

Application April 27, 1935, Serial No. 18,598

2 Claims. (Cl. 77—65)

My invention relates to a drilling and boring tool for operating on metal. In metal working, it has heretofore been common practice where a hole in the metal having a true center was required to drill the hole first with a suitable drill and thereafter, with a separate tool, bore out the sides of the drilled hole to a true center. In the drilling operation, it is difficult and, in fact, almost impossible to center the drill in the work to the degree of accuracy required, since both in starting the drilling operation and in the subsequent drilling operation the side pressure is almost certain to have an effect on the drill, which will cause it to shift slightly to one side or the other of the axis of the drill chuck in which the drill is held. To true up the inaccuracies resulting from the drilling operation, a boring tool is used, which takes a comparatively light cut from the side surfaces of the hole so that the bored hole will be on a true center coaxial with the axis of the drill chuck within the degree of accuracy required. This method requires two complete separate tools and two complete separate operations.

My invention contemplates a tool having a shank portion having means at its upper end for engagement with a drill chuck, a drilling tool portion carried by the shank portion at its lower end for drilling a hole through the metal worked on, and a boring tool mounted for radial adjustment on said shank portion intermediate the drilling tool portion and the chuck engaging portion, whereby the same tool may be used both for the drilling operation and the finished boring operation, thus making one tool serve the use of two and shortening the time for the complete operations.

Further objects will appear from the description and claims.

In the drawing, in which an embodiment of my invention is shown,—

Figure 1:
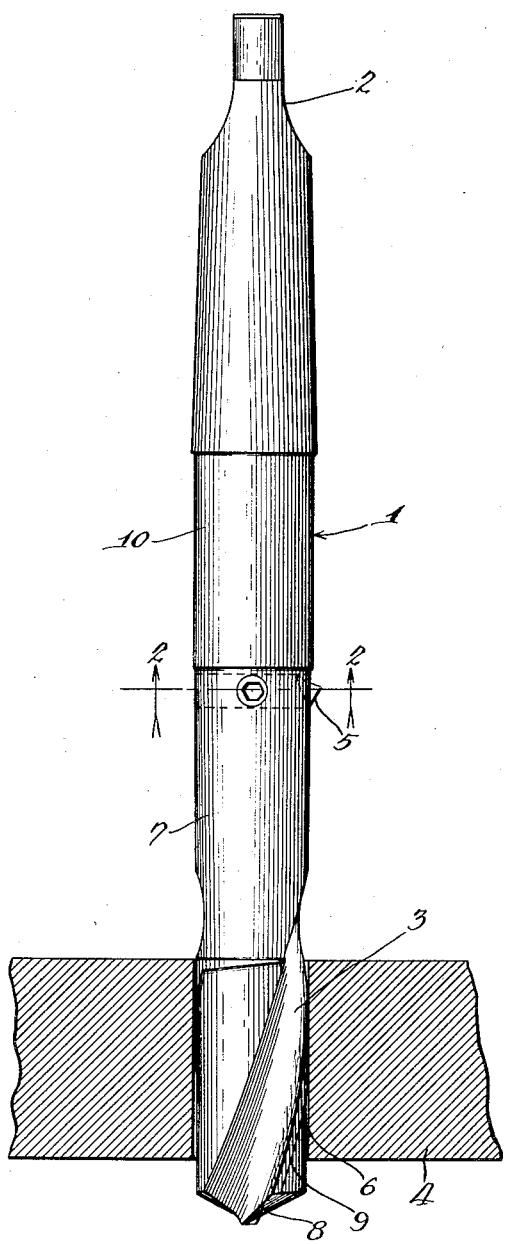
Figure 1 is a side elevational view of a tool embodying my invention.
Figure 2:
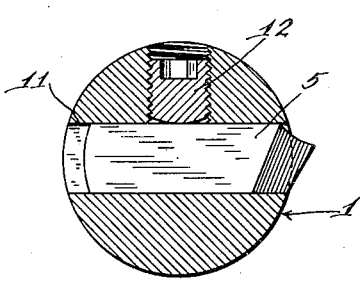
Fig. 2 is a section on the line 2—2 of Fig. 1.
Figure 3:
Fig. 3 is a perspective view of the radially adjustable boring tool.

Referring to the drawing in detail, the construction shown comprises a metal drilling and boring tool having a shank portion 1 having means 2 at its upper end for engagement with a drill chuck, a drilling tool portion 3 carried by the shank portion at its lower end for drilling a hole through the metal 4 worked on and a boring tool 5 mounted for radial adjustment on the shank portion intermediate the drilling portion 3 and the chuck engaging portion 2. This boring tool 5 is spaced from a drilling tool portion 3 a distance such that the drilling tool portion will have passed through the work 4 and completely disengaged itself from the side of the drilled hole 6 before the boring tool 5 begins to cut material from the sides of the hole whereby the boring tool is centered solely by the engagement of the shank portion with the chuck. This spacing of the boring tool prevents the drilling tool portion from exerting any side thrust on the shank which might throw the boring tool off center.

That portion 7 of the shank between the drilling tool portion 3 and the boring tool 5 is smaller in diameter than the drilled hole 6 whereby the chips from the boring tool 5 can pass downwardly along this reduced portion 7 as the boring tool cuts. The drilling tool portion may be of any usual or suitable type, having the usual lower cutting edges 8 and spiral raised "land" portions 9 for cleaning out the cutttings and keeping the drill properly centered. The portion 10 of the shank above the boring tool 5 is slightly smaller in diameter than the finished diameter of the bored opening so as not to interfere with the centering action of the drill chuck. The boring tool is mounted in a diametral opening 11 in the shank of the tool so as to be slidably adjustable therein and can be securely held in its set position by means of a set screw 12 threaded into an opening in the shank. The length of the boring tool 5 is not materially greater than the length of the diametral opening 11 in the shank so that the boring tool is substantially housed and protected in the opening. The point of the boring tool is thus protected against injury in handling or when the tool is laid down on its side, etc. The set screw 12 also is substantially housed in the shank whereby it does not interfere with the passage of the boring tool through the metal being bored.

Figure 4:
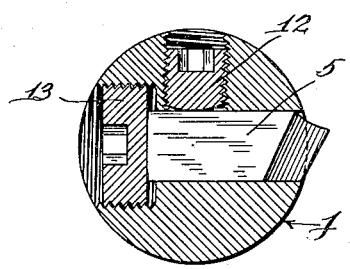
Fig. 4 is a cross sectional view similar to Fig. 2 but showing an adjusting means for the boring tool.

If desired, as shown in Fig. 4, means may be provided for adjusting the boring tool radially, the means shown comprising a screw 13 threaded in the shank and engaging the end of the boring tool. After the tool has been adjusted by means of the adjusting screw 13, it may be securely held in adjusted position by tightening up the set screw 12.

Further modifications will be apparent to those skilled in the art and it is desired, therefore, that the invention be limited only by the prior art and the scope of the appended claims.

Having thus described my invention, what I claim and desire to secure by Letters Patent is:

1. A metal drilling and boring tool comprising a shank portion having means at its upper end for engagement with a drill chuck, a drilling tool portion carried by the shank portion at its lower end for drilling a hole through the metal worked on, and a side-cutting boring tool mounted for radial adjustment on said shank portion intermediate the drilling tool portion and the chuck engaging portion, said drilling tool portion comprising lower cutting edges and cleaning edges above the cutting edges extending in a generally axial direction for cleaning out the cuttings and keeping the drill centered, said side-cutting boring tool being spaced from the upper part of the cleaning edges a distance at least as great as the axial extent of the cleaning edges whereby when the tool is used for boring a hole of the maximum depth of which it is capable, the drilling tool portion will have passed through the work and completely disengaged itself from the side of the drilled hole before the boring tool begins to cut material from the sides of the hole whereby the boring tool is centered solely by the engagement of the shank portion with the chuck.

2. A metal drilling and boring tool comprising a shank portion having means at its upper end for engagement with a drill chuck, a drilling tool portion carried by the shank portion at its lower end for drilling a hole through the metal worked on, and a side-cutting boring tool mounted for radial adjustment on said shank portion intermediate the drilling tool portion and the chuck engaging portion, said drilling tool portion comprising lower cutting edges and cleaning edges above the cutting edges extending in a generally axial direction for cleaning out the cuttings and keeping the drill centered, said side-cutting boring tool being spaced from the upper part of the cleaning edges a distance at least as great as the axial extent of the cleaning edges whereby when the tool is used for boring a hole of the maximum depth of which it is capable, the drilling tool portion will have passed through the work and completely disengaged itself from the side of the drilled hole before the boring tool begins to cut material from the sides of the hole whereby the boring tool is centered solely by the engagement of the shank portion with the chuck, that portion of the shank between the drilling tool portion and the boring tool being smaller in diameter than the drilled hole whereby the chips from the boring tool can pass downwardly along this reduced portion as the boring tool cuts.

EMIL A. BAUMBACH.